United States Patent
Vaes et al.

(10) Patent No.: US 10,573,502 B2
(45) Date of Patent: Feb. 25, 2020

(54) ACCELERATOR MASS SPECTROMETRY METHOD

(71) Applicant: NEDERLANDSE ORGANISATIE VOOR TOEGEPAST-NATUURWE-TENSCHAPPELIJK ONDERZOEK TNO, The Hague (NL)

(72) Inventors: Wouter Henricus Johannes Vaes, 's-Gravenhage (NL); Esther van Duijn, 's-Gravenhage (NL)

(73) Assignee: NEDERLANDSE ORGANISATIE VOOR TOEGEPAST-NATUURWE-TENSCHAPPELIJK ONDERZOEK TNO, The Hague (NL)

( * ) Notice: Subject to any disclaimer, the term of this patent is extended or adjusted under 35 U.S.C. 154(b) by 0 days.

(21) Appl. No.: 15/781,516

(22) PCT Filed: Dec. 15, 2016

(86) PCT No.: PCT/NL2016/050878
§ 371 (c)(1),
(2) Date: Jun. 5, 2018

(87) PCT Pub. No.: WO2017/105235
PCT Pub. Date: Jun. 22, 2017

(65) Prior Publication Data
US 2018/0277347 A1    Sep. 27, 2018

(30) Foreign Application Priority Data
Dec. 15, 2015 (EP) ..................... 15200186

(51) Int. Cl.
*H01J 49/00* (2006.01)
*B01D 59/48* (2006.01)
*H01J 49/04* (2006.01)

(52) U.S. Cl.
CPC .......... *H01J 49/0086* (2013.01); *B01D 59/48* (2013.01); *H01J 49/04* (2013.01)

(58) Field of Classification Search
CPC ........ H01J 49/0086; H01J 49/04; B01D 59/48
USPC ................................ 250/281, 282
See application file for complete search history.

(56) References Cited

PUBLICATIONS

Wang, et al ("Applying accelerator mass spectrometry for low-level detection of complex engineered nanoparticles in biological media," Journal of Pharmaceutical and Biomedical Analysis 97 (2014) 81-87) (Year: 2014).*

Wang et al., "Applying accelerator mass spectrometry for low-level detection of complex engineered nanoparticles in biological media", Journal of Pharmaceutical and Biomedical Analysis, 2014, vol. 97, pp. 81-87.

Srncik et al.,"Depth profile of 236U/238U in soil samples in La Palma, Canary Islands", Journal of Environmental Radioactivity, 2011, vol. 102, No. 6, pp. 614-619.

(Continued)

*Primary Examiner* — Michael Maskell
(74) *Attorney, Agent, or Firm* — Lucas & Mercanti, LLP

(57) ABSTRACT

Accelerator mass spectrometry methods for analyzing a sample are provided. In an embodiment, the method includes measuring with an accelerator mass spectrometry system, an isotope of a first element and an isotope of a second element, wherein the measurement of the second element is used for normalizing the measurement of the first element.

16 Claims, 1 Drawing Sheet

(56) References Cited

PUBLICATIONS

Srncik et al., "First measurements of 236U concentrations and 236-U /239Pu isotopic ratios in a Southern Hemisphere soil far from nuclear test or reactor sites", Journal of Environmental Radioactivity, 2014, vol. 132, pp. 108-114.
Matsunaka et al., "Pre- and post-accident 129I and 137 Cs levels, and 129I/137 Cs ratios in soil near the Fukushima Dai-ichi Nuclear Power Plant, Japan", Journal of Environmental Radioactivity, 2015, vol. 151, pp. 209-217.
Husakova et al., "Analytical capabilities of inductively coupled plasma orthogonal acceleration time-of-flight mass spectrometry (ICP-oa-TOF-MS) for multi-element analysis of food and beverages", Food Chemistry, 2011, vol. 129, No. 3, pp. 1287-1296.
Husakova et al., "Multi-element analysis of milk by ICP-oa-TOF-MS after precipitation of calcium and proteins by oxalic and nitric acid", Talanta, 2013, vol. 106, pp. 66-72.
Saha et al., "Simultaneous quantification and isotope ratio measurement of boron in uranium-silicon-aluminium compounds by inductively coupled plasma orthogonal acceleration time of flight mass spectrometry (ICP-oa-TOFMS) after its separation by pyrohydrolysis", Microchemical Journal, 2015, vol. 121, pp. 56-64.
International Search Report and International Written Opinion for PCT/NL2016/050878 (9 Pages) (dated Feb. 28, 2017).

\* cited by examiner

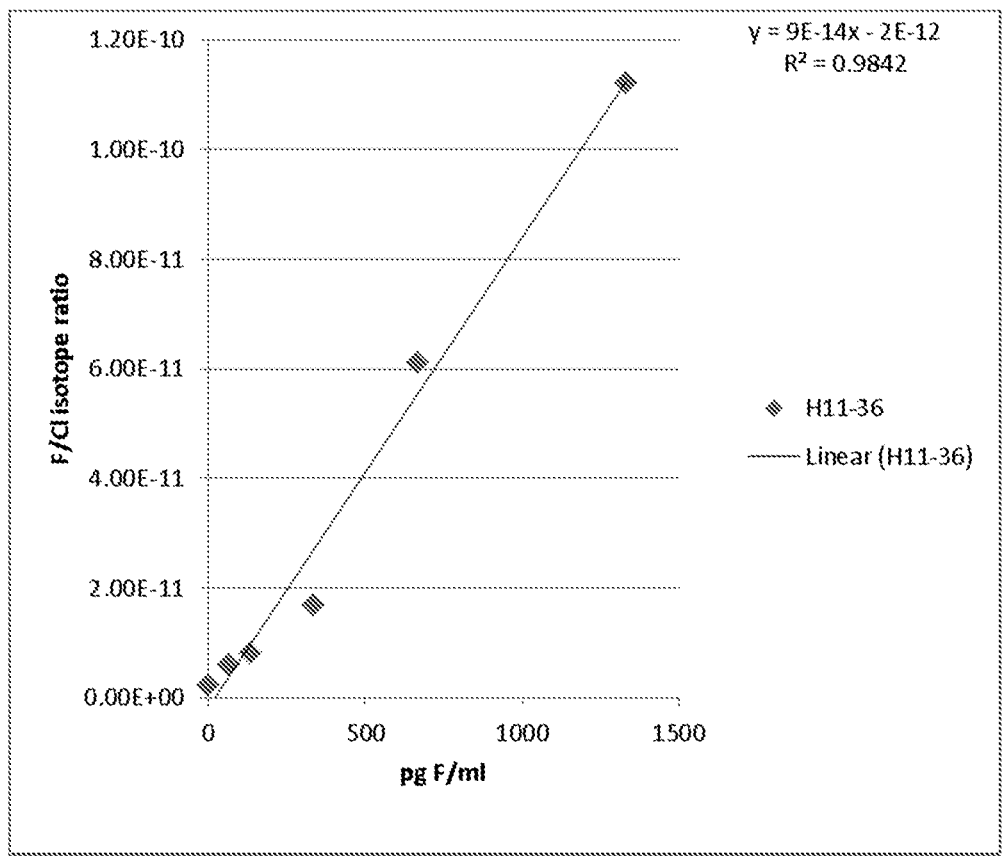

ACCELERATOR MASS SPECTROMETRY METHOD

CROSS-REFERENCE TO RELATED APPLICATIONS

This application is a 371 of PCT/NL2016/050878, filed Dec. 15, 2016, which claims the benefit of European Patent Application No. 15200186.3, filed Dec. 15, 2015.

FIELD Of The INVENTION

The invention relates to an accelerator mass spectrometry method for analysing a sample.

BACKGROUND Of The INVENTION

Accelerator mass spectrometry (AMS) is mainly used for detecting trace amounts of rare isotopes in samples. Generally, AMS is used for measuring the ratio of a rare isotope to an abundant isotope of the same element. For example, AMS can be used for detecting the rare isotope $^{14}C$ in the presence of the much more abundant isotopes $^{12}C$ and $^{13}C$. This can be used for determining the $^{14}C/^{12}C$ ratio for example for radio carbon dating of samples. An important advantage of AMS is the extreme sensitivity of the method. Features of AMS which contribute to its sensitivity include the suppression of molecular isobars and the use of detectors capable of detecting individual ions. An introduction to AMS and some of its applications is given in Yuangfang et al. (*Pure & Appl. Chem.* 66(2):305-334, 1994).

AMS can also be used in biomedical applications, in particular for drug development. For instance, AMS can be used for obtaining ADME (absorption, distribution, metabolism and excretion) parameters and/or other pharmacokinetic parameters of test compounds. Such studies are performed for example under the framework of the regulatory guidelines for metabolites in safety testing (MIST). For this purpose, generally a radiolabelled test compound is used. The most often used radiolabel is $^{14}C$. Some isotopes which are less frequently used as radiolabel include $^{10}Be$, $^{26}Al$, $^{41}Ca$, and $^{129}I$. The radiolabels can be used as tracer of the drug compound and metabolites thereof by virtue of the low natural abundance of these isotopes. They can also be used as tracer to show ADME behaviour of the particular atomic species itself, e.g. for $^{26}Al$ and $^{41}Ca$. The extreme sensitivity of AMS (routinely 1 pg/mL or lower) allows for example for performing ADME studies, in particular mass balance studies, with low doses of a radiolabelled test compound. Using radiolabels has as disadvantage that it is costly to prepare test compounds in which a rare isotope is incorporated as radiolabel. Therefore, it would be beneficial if fluorine could be used as tracer in mass balance studies, because about 25% of the number of candidate drug compounds comprises fluorine groups. For certain platina comprising drugs, it would be useful if platina could be used as tracer.

Mutlib et al. mention that a mass balance study of fluorinated compounds was performed using $^{19}F$-NMR (nuclear magnetic resonance) (*Chem. Res. Toxicol.* 25(3): 572-83, 2012). Generally, the sensitivity of $^{19}F$-NMR leaves room for improvement.

For samples containing an analyte compound labelled with $^{14}C$, AMS can for example provide a $^{14}C/^{12}C$ isotope ratio. This isotope ratio can be interpreted for example using the formula:

$$K=(R_M-R_N)*F*(W/L)$$

where K is the concentration of analyte, $R_M$ is the isotope ratio of the sample, $R_N$ is the natural background isotope ratio, F is the carbon mass fraction in the sample (% C), W is the molecular weight of the analyte, and L is the specific molar activity of the analyte. L may indicate the average number of $^{14}C$ per molecule. Also possible is the use of a calibration curve.

Accordingly, there is a desire for a method which allows for determining the quantity and/or concentration of an element in samples, in particular biological samples, with high sensitivity and without requiring the use of radiolabelled compounds. Also desired are accelerator mass spectrometry methods for analysing samples which have more flexibility as to the measured isotopes.

The present inventors have found that the above-mentioned desires can at least in part be met by using accelerator mass spectroscopy and measuring isotopes of two different elements.

SUMMARY Of The INVENTION

Accordingly, the invention relates in a first aspect to an accelerator mass spectrometry method for analysing a sample, comprising measuring with an accelerator mass spectrometry system at least one isotope of a first element and at least one isotope of a second element, wherein the measurement of the second element is used for normalizing the measurement of the first element.

The method of the invention allows for determining the quantity of an element with high sensitivity, in particular in biological samples. For example, the method may allow for a lower limit of quantification (LLOQ) of less than 1 pg/mL for instance less than $10^{-15}$ g/ml. Hence the method may allow for determining the concentration of an element in a sample at an extremely low concentration of the element. The method may further allow for avoiding the use of radiolabelled compounds. In particular, the method may advantageously allow for performing mass balance studies and/or other pharmacokinetic studies of certain candidate drug compounds without the need for radiolabelling, in particular for compounds containing fluorine or transition metals such at Pt.

DETAILED DESCRIPTION OF THE INVENTION

In an aspect, the invention relates to an accelerator mass spectrometry method for analysing a sample. The method comprises measuring with an AMS system at least one isotope of a first element and at least one isotope of a second element. The first and second isotopes are both measured on the same sample as supplied into the AMS system. For example, the method may comprise ionizing the sample such that ions of both the first and the second isotope are simultaneously released from the sample.

Typically, the method is for determining the quantity and/or concentration of the first element in the sample. The method can comprise providing the sample, optionally pre-treating the sample, and analysing at least a part of the sample with an AMS system. Usually, the method comprises simultaneous or sequential injection of ions of an isotope of the first element and of an isotope of the second element into the accelerator of the AMS system. The method usually comprises measuring ions of an isotope of said first element and measuring ions of an isotope of said second element with AMS. These measurements each provide a flux of the ionic species.

The measurement of the second element is used for normalizing the measurement of the first element. The method accordingly comprises using the measurement of the second element hence is used in the calculation of the concentration/and or amount of the first element in the sample. The normalization may include normalizing the result of the measurement of at least one isotope of the first element, or of any value calculated from said result. Preferably, the method comprises measuring with the AMS system ions of said isotopes, wherein said ions are obtained from said sample.

The measurement of the second element, in particular the measured flux, can be used for normalizing the measurement of the first element, and/or for calculation of the quantity and/or concentration of the first element in the sample. Herein, normalizing the measurement of the first element includes for example calculating the quantity and/or concentration of the first element in the sample based on a measurement result obtained for the first element in combination with a measurement result obtained for the second element, while further using available information about the quantity and/or concentration of the second element in the sample, for instance in the sample as measured.

For example, the method can comprise determining the concentration and/or quantity of the second element in the sample, for instance using a method different from AMS. This quantity and/or concentration can for example have been determined or estimated earlier. For instance, a nominally, known, or measured amount of the second element can be added to the sample. The method may also comprise deriving the quantity and/or concentration of the second element from the flux measured for the second element, using a calibration curve of a series of calibration samples for the second element. This quantity or concentration of the second element may be multiplied with the ratio of the first to the second element as obtained from the AMS measurement. The ratio of the first to the second element can be derived from the measured fluxes for ionic species of isotopes of the first and the second element, for example by appropriate corrections for the isotope distribution of each element.

It is further possible to use external calibration samples, for instance reference samples with known ratios between the first and second element, or standard samples prepared in the same matrix as the sample. For example, the ratio of the first and the second ionic species, isotope, or element is calculated and compared with the ratios of the calibration samples.

Accordingly, in a preferred embodiment, the normalization may involve using a ratio of a value derived from a result of a measurement of ions of an isotope of the first element to a value derived from a result of a measurement of ions of an isotope of the second element to calculate said quantity and/or concentration. The method may comprise calculating such ratio.

If necessary, the quantity and/or concentration of the second element in the sample can for example be determined using conventional elemental analysis methods, such as ion selective electrodes, ion chromatography, atomic absorption spectrometry, and X-ray fluorescence analysis.

In the method, an isotope of a first element (first isotope) and an isotope of a second element (second isotope) are measured.

The first and/or second isotope can for instance be a stable isotope. Preferably, the first isotope is a stable isotope, more preferably the first and the second isotope are both stable isotopes.

The first and the second chemical element are different from each other. The first and second element are preferably each capable of forming stable negative ions. Preferably the second element is more abundant than the first element in the sample. Preferably, the second element has a higher atomic concentration in the sample (mol atoms/kg sample) than the first element. Preferably, the second element has an atomic concentration in the sample which is at least 10 times, or at least 100 times, or at least $10^3$, or at least $10^4$ times higher than the atomic concentration of the first element. Accordingly, the concentration of the second element in the sample can be above the LLOQ of a method used for determining it, if any, while the concentration of the first element can be much lower than that LLOQ. The method is particularly useful if the first element has a low concentration in the sample, for example a concentration of less than 1.0 mg/L, preferably less than 50 µg/L, or less than 10 µg/L, or less than 1.0 µg/L, or less than 100 ng/L, or for example less than 1.0 ppm by weight, or even less than 1.0 ppb by weight or less than 100 ppt by weight. The second element may for example have a concentration of at least 10 µg/L, or at least 1.0 mg/L, for example at least 10 mg/L, least 0.10 g/L or at least 0.50 g/L.

For a given first element as analyte, a second element can be selected for example by taking into account that the second element needs to be ionized with the ion source used in the method, such as in a Cs sputter. Preferably, the first and the second element have a similar mass/charge ratio for one or more of their ionic species. Further, the first and second elements are preferably similar in chemistry, for example to obtain a similar salt as precipitate. The second element preferably has a stable isotope with an atomic mass which is for example a multiple or a fraction of the atomic mass of an isotope of the first element (for instance giving a ratio of 1:1, 1:2, 1:3, 2:1, or 3:1), plus or minus 0 to 5 Dalton.

The choice of the first element can depend on the sample. In case of biological samples, the first element can be selected for example from the group consisting of: F, Pt, Si, Br, I, B, Se, metal elements and transition metal elements, for example including Fe, Zn, Cu, Al, Ni, Cr, Mn, Li, Cs, Mo, Co, Sb, Ag, Nb, Zr, V, Ti, and Au. For example, fluorine can be used as first element in combination with chlorine as second element, or platina can be used as first element in combination with gold as second element. Numerous other combinations are possible. A first element can often be used in combination with various second elements.

The method of the invention comprises analysing at least a part of the sample with an accelerator mass spectrometry system. Hence, at least part of the sample is subjected to accelerator mass spectrometry using an AMS system. Generally, the AMS system comprises an ion source, configured for receiving a sample and ionizing at least part thereof to produce ions, an accelerator, and at least one detector. The AMS system further comprises one or more analysers, typically both upstream and downstream of the accelerator, for selecting ions by for example mass and/or momentum. The ion source can for example comprise a caesium sputter ion source, a laser, or inductively coupled plasma, and may comprise a chamber for receiving the sample.

The sample as supplied into the AMS system comprises the first and the second element. The amount of sample introduced into the AMS system can for example be between 1 µg and 100 mg, for example 1-2 mg.

The method generally comprises ionizing at least part of the sample to yield anions.

The AMS system comprises at least an accelerator. For example, a tandem accelerator can be used, or a single-ended electrostatic accelerator. A tandem accelerator is preferred and generally comprises a negative ion acceleration section, an electron stripper for conversion of negative ions to positive ions, for instance using a foil or a gas cell with for example Ar, and a positive ion acceleration section. The positive ions generally leave the accelerator from the positive ion acceleration section. AMS usually comprises providing energy to the ions of at least 0.10 MeV, or at least 0.30 MeV, or at least 0.50 MeV. The terminal voltage of the accelerator can for instance be at least 0.50 MV, at least 1.0 MV, or at least 2.0 MV, for example 10 MV or more. An example of a suitable AMS system is MICADAS (Mini Carbon Dating system) that is specifically designed for $^{14}C$ analysis, with a 200 kV accelerator voltage. Both solid and gas samples can be accepted by the ions source.

Between the ion source and the accelerator, the ions can for example be mass analysed, for example with a magnetic dipole, such that selected negative ions with a certain mass pass through for example an aperture and are injected into the accelerator.

The AMS system as used in the invention typically comprises a bouncer injector, for example using a retarding electrostatic field, in order to separate the ions by momentum and/or mass. A bouncer injector generally comprises a magnet and is generally is configured for sequential injection of different ions. Switching can for example be effected by applying different voltages to the electrically isolated vacuum box of the magnet. Accordingly, the method preferably comprises sequential, such as alternatingly, injection into the accelerator of ions having a mass corresponding to an ionic species of the first and ions having a mass corresponding to an ionic species of the second element, preferably by using a bouncer injector. In sequential injection, isotopes are injected into the accelerator one after the other by mass selection, generally by mass selection, and the injector cycles between the isotopes to be selected.

The AMS system can further comprise for example, one or more analysers for positive ions, downstream of the accelerator, wherein the analysers comprise a magnetic analyser and downstream thereof preferably an electrostatic accelerator and/or Wien filter. The positive ions are for example analysed for mass and/or momentum. An AMS system further comprises at least one detector, for instance an ionization detector, gas detector, or a solid state detector. The detector is usually configured for identifying and counting individual ions. The AMS may comprise one or more detectors which measure the energy loss, range, velocity, and/or total energy to identify the detected ions, for instance the detector used for measuring an isotope of the first element may measure one or more of these properties.

The AMS system can for instance comprise one or more Faraday cups, for collecting ions of the second element, and measuring the flux thereof as an electrical current. The Faraday cups are generally positioned off-axis.

Accordingly, the method preferably comprises providing at least a part of a sample comprising the first and second element into an ion source, where compounds of the first and second element are dissociated and negative ions of the first and of the second element are produced. The ions are for example pre-accelerated. Preferably the method comprises passing at least ions of a first isotope of the first element into an accelerator mass spectrometer, thereby forming positive ions. Preferably the method comprises stopping the positive ions of the first isotope in a particle detector downstream of the accelerator, and detecting stopped ions of said first isotope. The method comprises, as generally for AMS methods, separating ions of said first and second element upstream of said detector (i.e. of the first element). This is different from time-of-flight based mass spectrometry. Preferably, generally methods of the invention comprises subjecting a stream or beam comprising ions of said first and second element to separation of ions of said first element at least from ions of said second element, and preferably to sequentially selecting particles based on mass. Preferably, the method comprises directing a stream or beam comprising negative ions of said first and second element into at least one analyser, for separating ions of said first element at least from ions of said second element, and preferably for sequentially selecting particles based on mass. At least one analyser is upstream of the accelerator. Preferably the method comprises sequentially injecting into the accelerator at least one type of negative ions of said first element and at least one type of negative ions of said second element. The method can further comprise diverting with at least one analyser downstream of said accelerator ions of said second element into a measurement device positioned off-axis, for example a Faraday cup downstream of the accelerator, where the ions of the second element are collected and the flux is measured as electrical current. The ions of the first isotope are for example passed at least through a magnetic analyser and an electrostatic analyser and/or Wien filter downstream of the accelerator. The use of AMS allows not only for suppression of isobars by virtue of the stripping, but also for using detectors which are capable of counting individual ions, such as gas phase ionization detectors, in particular for the first element. In the method, preferably ions of the first element are detected by single-ion counting by a detector. Preferably, different detectors are used for measurement of the first element and of the second element. Hence, the AMS generally does not involve time of flight measurements or detectors.

The method for example comprises obtaining or providing a sample, a sample pre-treatment step, and thereafter a step of analysing the prepared sample with an AMS system.

Optionally, the method comprises depleting the sample of inorganic ions of the first element. The method may also comprise deleting the sample of inorganic ions of the second element. Such depletion can advantageously allow for determining the quantity and/or concentration of the first element in organic compounds comprising the first element in the sample. For example, in case fluorine is the first element and the sample comprises organic fluorine compounds and optionally fluoride, the method may comprise a pre-treatment step of depleting fluoride in the sample, for example using activated alumina, for example with alumina desiccant balls. Capacitive deionisation may also be used for fluoride depletion, optionally in combination. These methods advantageously do not or not substantially deplete chloride. The method can comprise drying of the optionally depleted sample.

The method can for example comprise as pre-treatment step oxidation of at least part of the sample, preferably complete oxidation. The sample preparation method for example includes the use of concentrated acid. For example, the sample is dissolved in concentrated sulphuric acid or nitric acid, which results in the formation of hydrogen fluoride in case of F as first element. Hydrogen fluoride can be converted into a salt. For example, lithium fluoride can be obtained by the addition of lithium carbonate.

Generally, the fluoride may be precipitated as salt, for instance such as LiF or $CaF_2$, for instance by adding calcium carbonate. The first and the second element are preferably co-precipitated, for example to provide a homogenous sample. The precipitate can optionally be washed. For Fe, the sample can for instance be dissolved in HCl, followed by pH controlled precipitation, drying and ignition and oxidation. For iodine, an alkaline compound can be added, the solution can be heated and an alkaline solution can be extracted, followed by acidification of the supernatant and addition of $AgNO_3$ to precipitate silver iodide.

The sample as provided into the negative ion source of the AMS system and as exposed to for example the $Cs^+$ ion beam, may for example comprise a salt of the first element and a salt of the second element.

The method may optionally comprise determining the concentration of the second element in the sample. An option is using a calibration series to correlate the flux as measured with AMS for the second element to concentrations thereof.

The concentration can for example be measured using ICP-MS or flame AAS. Yet a further option is using a clinical analyser to determine the concentration, in particular for Cl in plasma. The method may also comprise measuring the total volume or mass of the sample, to allow for calculating the total amount of first element in the sample. The method may also comprise measuring the concentration of the second element in the sample prior to the optional depletion of the sample in the first element.

The method may comprise as pre-treatment step one or more separation steps, for example to separate one or more compounds comprising the first element from the remaining part of the sample, and supplying these separated compounds to the AMS system. As separation step chromatography such as UPLC can be used.

The method may comprise as pre-treatment step the separation of sample into multiple fractions by a technique such as UPLC. The original compound can be separated from possible compound related metabolites or other products. When the UPLC is coupled on-line to a high resolution mass spectrometer, such as an orbitrap, compounds eluting from the UPLC can be identified directly. The simultaneously collected fractions can be quantified by AMS for the first element.

In an embodiment of the method, the atomic mass of an isotope of the first or second element plus or minus 0 to 5 Dalton is two times the atomic mass of an isotope of the other element, in particular for the measured isotopes. This is for instance the case if F is the first element and Cl is the second element. In this case, mass selection in a device upstream of a tandem accelerator, such as a bouncer injector, may for instance be for the dimer ion of the element with a lower atomic mass of the first and second element and for an atomic ion (consisting of 1 atom) of the other element. Preferably, the tandem mass accelerator is configured for producing positive ions of the element with higher atomic mass with oxidation state 2+. In this way, despite the large difference in mass between the isotopes, ions of the first and the second element can sequentially passed through the AMS system, in particular through a bouncer injector and through a mass analyser. In this preferred embodiment, the method benefits of a molecular ionic species, while the conventional aim of AMS is suppressing isobars and suppressing interference by molecular species. The method also departs from the conventional approach of determining the isotope ratio for ions having the same oxidation state.

In a preferred embodiment, the first element is F and the second element is Cl. In this embodiment, preferably at least $F^-$, $F_2^-$ and $Cl^-$ are formed in the ion source of the AMS.

The AMS system may comprise a device for sequential injection, for example a bouncer injector, upstream of the accelerator, configured for sequentially selecting a mass corresponding to $^{19}F_2^-$ and a mass corresponding to $^{35}Cl^-$. The similarity of the mass/charge ratio of these ions advantageously allows for doing so and for maintaining acceptable cycle frequency.

Hence a preferred method comprises sequentially injecting $^{19}F_2^-$ and $^{35}Cl^-$ into the accelerator using a bouncer injector. The cycle frequency can for instance be in the range of at least 5 $s^{-1}$, such as at least 100 $s^{-1}$. Preferably at least 90% of the time is spent on measuring the first element. The first element can for instance be sequentially injected with an injection time of less than 50 ms, such as less than 10 ms, per cycle.

The accelerator is preferably configured and/or operated for stripping $F_2^{31}$ into at least $F^+$ and $Cl^-$ into at least $Cl^{2+}$. For instance, the accelerator can be configured for providing $Cl^-$ ions with an energy of about 1 MeV in the negative ion acceleration section (such as before the stripper) for example, in the range of 0.60 to 1.40 MeV, more preferably 0.80 to 1.20 MeV. This may enable the formation of relatively more $Cl^{2+}$ compared to other energies. Each fluoride atom of $F_2^-$ is provided with half the energy, such as in the range of 0.30 to 0.70 MeV, advantageously giving a high relative intensity of $F^+$. Accordingly, in a preferred embodiment, the method comprises electron stripping of $F_2^-$ and $Cl^-$ at such energy that $F^+$ is the charge state of fluorine with the highest relative intensity, while $Cl^{2+}$ has a higher relative intensity than $Cl^0$, wherein intensity refers to the number of ions. Advantageously, the preferably produced $^{19}F^+$ and $^{35}Cl^{2+}$ have a similar mass/charge ratio allowing for passing these ions sequentially through for instance a magnetic analyser.

In yet a further embodiment, the method comprises sequentially selecting ionic species with masses corresponding to $^{19}F^-$ and $^{35}Cl^-$ and sequentially injecting these species into the accelerator. In such a method, the magnet of the bouncer injector is for example used as scanning magnet. This may involve changes of setting such as the terminal voltage and the electrostatic deflector voltage, and may involve the use of steering means and lenses.

Accordingly, in a preferred embodiment, the AMS system comprises a tandem accelerator and a sequential injector, preferably a bouncer injector, upstream of said accelerator for injecting negative ions into said accelerator, and the method preferably comprises sequentially selecting masses corresponding to $^{19}F_2^-$ or $^{19}F^-$ and $^{35}Cl^-$ with said injector, and wherein preferably the accelerator is configured for producing $F^+$ and $Cl^{2+}$. In an embodiment, the method comprises sequentially selecting masses corresponding to $^{19}F_2^-$.

The sample preferably comprises a biological sample, for example a physiological sample or excretion sample, or is derived thereof. Preferably, the biological sample comprises at least parts obtained from an organism, or a cultured tissue or tissue construct or cell culture. The biological sample may comprise cells. Biological samples include for example samples obtained from or derived from an organism, preferably a living organism. The organism can for instance be selected from the group consisting of animals, such as human and non-human mammals, plants, fungi, bacteria and archaea.

Suitable physiological samples include for example tissues and bodily fluids, and exhaled air, for example urine, faeces, blood, plasma, serum, saliva, and/or milk and exhaled air.

Some examples of samples which are at least in part derived from biological samples include various nutritional products, in particular meat products and dairy products. The sample can for instance comprise an infant formula product, for example as powder, liquid concentrate, or ready-to-feed form. The infant formula product may for example comprise a fat or lipid component, a protein component, and optionally polyunsaturated fatty acids, minerals and/or saccharides, and can for instance be at least in part derived from milk.

Preferably, the sample comprises an analyte compound and/or derivatives thereof. Preferably, the analyte compound contains the first element. For example, the analyte compound can comprise fluorine and preferably contains a C—F bond or Si—F bond. Preferably, the analyte is not a radiolabelled. Radiolabelled compounds include compounds wherein at least one radioisotope is incorporated and/or wherein at least one element is present in a pre-determined isotope ratio different from the natural abundance ratio of these isotopes.

The sample can for example be obtained from an organism which at least during at least one time period has been exposed to a substance or to which a substance has been administered during at least one time period, wherein preferably the sample is obtained from said organism at a pre-determined and/or measured time after said time period. The method may also comprise analysing sample taken before said exposure or administration Herein, being exposed to a substance includes uptake of the substance, ingestion of the substance and contact with the substance. Administration of a substance (or test compound) includes for example oral, nasal, rectal, intravenous, sublingual, epicutaneous, topical, and transdermal administration. The organism can also be an organism which is suspected to have been exposed to the substance, or is at risk of having been exposed to the substance. The substance can for instance be a drug, or can have a toxic, carcinogenic, or mutagenic effect or have another biological effect, or is suspected of having such effect.

The time period can be a single moment, for instance if a dose is administered to the organism, or a prolonged period such as at least 1 day or at least 1 week in case of exposure to the substance. The pre-determined and/or measure time can for instance be a day, week or month after said time period. The organism is preferably a human or non-human mammal.

The sample can for instance comprise a physiological sample and/or excretion sample obtained for example in a study for determining one or more of the adsorption, distribution, metabolism, and/or excretion properties of a test compound, such as a mass balance study.

Preferably, the sample is obtained from a subject, such as a healthy human, to which a pre-determined dose of a test compound has been administered, preferably in a mass balance study. Other animal subjects can also be used, for example rat, mouse, pig, rabbit, a non-human primate, or a cynomolgus monkey. Preferably, the samples were obtained by collecting excretion samples from said subject, typically at least urine and faeces, and often also blood or plasma samples are taken, at a plurality of pre-determined or measured times after the dose was administered.

The method can comprise administering a dose of a test compound to a subject. The method can further comprise collecting excretion samples in a period after administering the dose, for example a period of at least 1 day, or at least 2 days, or at least 5 days. This method may for example involve collecting substantially all faeces and urine of the subject during such period. The method can comprise measuring the presence of the first element in at least part of the samples using the AMS method of the invention. Use of AMS allows for quantification of the total amount of the test compound and any metabolites thereof which contain the first element, even if of unknown structure.

Hence, preferably the sample comprises the test compound and/or metabolites thereof. By using such samples, the route of excretion of the test compound and derivatives (in particular metabolites thereof) can be determined. The test compound can for example be said analyte compound, and preferably comprises the first element and is not radiolabelled. The test compound is generally a candidate drug or drug-related material. The test compound preferably comprises fluorine as the first element, more preferably molecules of the test compound comprise at least one fluorine atom covalently bound to a carbon atom.

Especially for candidate drug molecules as test compound, the compound can comprise fluorine groups, such that fluorine can be used as first element and chlorine as second element. For platina containing drugs such as cisplatin compounds, platina can be used as first element.

The test compound can for instance also be or be suspected of being toxic, carcinogenic, or mutagenic or having another biological effect. The test compound can for example have a molecular weight of 100 Dalton or more, for instance 400 Dalton or more. The administered dose can for example be less than 1 g, or less than 100.0 mg, or less than 20 mg, or less than 10 mg, or less.

The invention also relates to AMS method for analysing a sample, comprising measuring with an AMS system at least one isotope of a first element and at least one isotope of a second element, comprising sequentially selecting a mass of an ionic species of an isotope of the first element and of the second element for sequential injection into the accelerator. Preferably, the first element is F and the second element is Cl, and more preferably the ionic species are as described before.

As used in this application, the indefinite article "a" and "an" does not exclude a plurality of the recited feature. The terms "first", "second" and any other ordinal number are used as identifiers and do not exclude the presence of other instances of the recited feature. The features of various embodiments can be combined.

An embodiment will now be illustrated with the following example, which does not limit the invention or the claims.

EXAMPLE 1

The AMS comprises several units, including the low energy end (including the ion source), the accelerator and the high energy end (including the gas phase ionisation detector). Generally, the settings may vary, for example depending on the selection of the ions.

At the low energy end the negatively charged dimer of F was selected for transmission through the bouncer injector ($^{19}F_2^-$). After the accelerator positively charged F ($F^+$) ions are selected. Regarding the counter ion; $Cl^-$ was selected at the low energy side, and $Cl^{2+}$ at the high energy side of the AMS.

Example Instrumental Settings

Ionizer: 18 A; Cesium temperature: 60 C; Target voltage: 7 kV; Extraction voltage: 28 kV; Terminal voltage: 600 kV; Stripper gas pressure: 2 20-2 mbar; Detector gas pressure: 7 mbar; ESA voltage: 40 kV; Bouncer Injector: 84 A; Analyzing magnet: 214 A; Time for Cl: 100 µs; Time for F: 10 ms The following experiment has been performed:

A solution of $1 \cdot 10^{-7}$ g/mL CaF was prepared in methanol and mixed with a 10 mg/mL solution of LiCl (prepared in methanol). To each sample silver (Ag) was added, and the targets for the AMS were pressed. The silver provides for more material for pressing and for conduction during the ionisation process in the AMS source. The results are shown in FIG. 1 and table 1. This example demonstrates F/Cl calibration with AMS. Good results were obtained even for concentrations lower than 100 pg F/ml, in particular a linear correlation between F/Cl isotope ratio and F concentration was achieved.

In FIG. 1, H11-36 is the number of the example. The line shows the linear interpolation with y=8.56E-14x-1.70E-12 and $R^2$=0.984. The diamonds show the experimental results.

Table 1, note (1): the samples are mixed with 0.25 mg LiCl/mg Au. When using only a 1 mg/mL LiCl solution the same ratio would be measurable if the F concentration would also drop by a factor 10. Thus the concentration of F in pg/mL that can be quantified would also be a factor 10 lower. The amount of Cl that will be sufficient to generate a stable current on the Faraday cups (after the analysing magnet) is not yet determined for the example AMS, however it is expected that it can be lower than the 0.25 mg LiCl/mg Ag that is currently used.

TABLE 1

| | mg Ag | μL CaF solution ($1 \cdot 10^{-7}$ g/mL) | pg F/mL | Measured ratio | pg F/mL that can be quantified (1) |
|---|---|---|---|---|---|
| Sample 1 | 1 | 40 | 19800 | 1.12174E-10 | 1980 |
| Sample 2 | 1 | 20 | 9900 | 6.09813E-11 | 990 |
| Sample 3 | 1 | 10 | 4500 | 1.69919E-11 | 450 |
| Sample 4 | 1 | 4 | 500 | 8.12944E-12 | 50 |
| Sample 5 | 1 | 2 | 250 | 6.06532E-12 | 25 |
| Sample 6 | 1 | 0 | 0 | 2.3481E-12 | 0 |

The invention claimed is:

1. An accelerator mass spectrometry method for analyzing a sample, comprising
   supplying said sample into an accelerator mass spectrometry system, and
   measuring with said accelerator mass spectrometry system an isotope of a first element and an isotope of a second element,
      wherein said isotope of said first element and said isotope of said second element are both measured on said sample supplied into said accelerator mass spectrometry system, and
      wherein the measurement of the second element is used for normalizing the measurement of the first element.

2. The method according to claim 1, wherein the method is for determining the quantity and/or concentration of the first element in the sample, and comprises providing the sample, analyzing a part of the sample with accelerator mass spectrometry with sequential injection of ions of an isotope of the first element and ions of an isotope of the second element into the accelerator, thereby measuring said ions separately, and
   wherein said normalization involves using a ratio of a value derived from the result of the measurement of ions of an isotope of the first element to a value derived from the result of the measurement of ions of an isotope of the second element to calculate said quantity and/or concentration.

3. An accelerator mass spectrometry method for analyzing a sample, comprising measuring with an accelerator mass spectrometry system an isotope of a first element and an isotope of a second element,
   wherein the measurement of the second element is used for normalizing the measurement of the first element, and
   wherein said first element is fluorine and said second element is chlorine.

4. The method according to claim 3, wherein said accelerator mass spectroscopy system comprises a tandem accelerator and an injector for sequentially injecting selected ions into the accelerator, and the method comprises sequentially selecting masses corresponding to $^{19}F_2^-$ or $^{19}F^-$ and $^{35}Cl^-$ with said injector.

5. The method according to claim 4, wherein said method comprises sequentially selecting masses corresponding to $^{19}F_2^-$ and $^{35}Cl^-$ with said injector, and wherein the accelerator is configured for producing $F^+$ and $Cl^{2+}$.

6. The method according to claim 1, wherein a stable first isotope of said first element is measured, and wherein said second element is more abundant than said first element in the sample.

7. The method according to claim 1, wherein said sample comprises a biological sample.

8. The method according to claim 1, wherein said sample comprises one or more selected from the group consisting of urine, faeces, blood, plasma, serum, tissue, saliva, exhaled air, and milk.

9. The method according to claim 1, wherein a sample is obtained from an organism which during a time period has been exposed to a substance or to which a substance has been administered during a time period, wherein the sample is obtained from said organism at a pre-determined and/or measured time after said time period.

10. The method according to claim 1, wherein said sample is obtained in a mass balance study from a subject to which a dose of a test compound has been administered.

11. The method according to claim 10, wherein said sample comprises said test compound and/or metabolites of said test compound.

12. An accelerator mass spectrometry method for analyzing a sample, comprising measuring with an accelerator mass spectrometry system an isotope of a first element and an isotope of a second element,
   wherein the measurement of the second element is used for normalizing the measurement of the first element,
   wherein said sample is obtained in a mass balance study from a subject to which a dose of a test compound has been administered, and
   wherein molecules of said test compound comprise a fluorine atom covalently bound to a carbon atom.

13. The method according to claim 1, wherein the method comprises separating ions of said first and second element upstream of the detector for ions of at last the first element.

14. An accelerator mass spectrometry method for analyzing a sample, comprising measuring with an accelerator mass spectrometry system an isotope of a first element and an isotope of a second element,
   wherein the measurement of the second element is used for normalizing the measurement of the first element, and
   wherein the first element is platina and the second element is gold.

15. The method according to claim 7, wherein the biological sample is a physiological sample or excretion sample or is at least in part derived thereof.

16. The method according to claim 1, wherein the method is for determining the quantity and/or concentration of the first element in the sample, and comprises providing the sample, analyzing the sample with accelerator mass spectrometry with sequential injection of ions of an isotope of the first element and ions of an isotope of the second element into the accelerator, thereby measuring said ions separately, and wherein said normalization involves using a ratio of a value derived from the result of the measurement of ions of an isotope of the first element to a value derived from the result of the measurement of ions of an isotope of the second element to calculate said quantity and/or concentration.

* * * * *